(12) United States Patent
Wu et al.

(10) Patent No.: US 9,471,012 B2
(45) Date of Patent: *Oct. 18, 2016

(54) COATING COMPOSITION

(71) Applicant: XEROX CORPORATION, Norwalk, CT (US)

(72) Inventors: Jin Wu, Pittsford, NY (US); Jonathan H. Herko, Walworth, NY (US); Varun Sambhy, Penfield, NY (US); Lin Ma, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 459 days.

This patent is subject to a terminal disclaimer.

(21) Appl. No.: 14/032,446

(22) Filed: Sep. 20, 2013

(65) Prior Publication Data

US 2015/0086798 A1 Mar. 26, 2015

(51) Int. Cl.

| C08L 79/08 | (2006.01) |
| C08L 83/12 | (2006.01) |
| B29C 41/00 | (2006.01) |
| G03G 15/20 | (2006.01) |
| B29C 41/28 | (2006.01) |
| G03G 15/16 | (2006.01) |
| B29L 29/00 | (2006.01) |
| B29K 79/00 | (2006.01) |
| B29K 105/16 | (2006.01) |

(52) U.S. Cl.
CPC .............. *G03G 15/20* (2013.01); *B29C 41/003* (2013.01); *B29C 41/28* (2013.01); *G03G 15/162* (2013.01); *B29K 2079/085* (2013.01); *B29K 2105/16* (2013.01); *B29K 2905/12* (2013.01); *B29L 2029/00* (2013.01); *C08L 79/08* (2013.01); *C08L 83/12* (2013.01); *Y10T 428/31721* (2015.04)

(58) Field of Classification Search
CPC .. G03G 15/20; G03G 15/162; B29C 41/003; B29C 41/28; B29L 2029/00; B29K 2079/085; B29K 2105/16; B29K 2905/12; Y10T 428/31721; C08L 79/08; C08L 83/12
See application file for complete search history.

(56) References Cited

U.S. PATENT DOCUMENTS

| 5,272,194 A | 12/1993 | Arduengo, III et al. |
| 5,559,074 A * | 9/1996 | Watanabe .............. B41N 1/245 33/563 |
| 6,175,028 B1 * | 1/2001 | O'Lenick, Jr. ........ A61K 8/0295 528/25 |
| 2012/0248379 A1 * | 10/2012 | Wu ........................ C08G 73/14 252/500 |
| 2013/0029148 A1 | 1/2013 | Carney et al. |

OTHER PUBLICATIONS

Jin Wu et al., "Fuser Member", U.S. Appl. No. 13/442,240, filed Apr. 9, 2012.
Jin Wu et al., "Fuser Member Coating Compositions", U.S. Appl. No. 13/773,619, filed Feb. 21, 2013.
Author Unknown, Chapter 1, Polyimides: chemistry & structure-property relationships—literature review, http://scholar.lib.vt.edu/theses/available/etd-051799-162256/unrestricted/polyimide1.pdf, pp. 3-28.
Author Unknown, Product Specification, Poly(pyromellitic dianhydride-co-4,4'-oxydianiline), amic acid solution—electronic grade, Sigma-Aldrich, p. 1.
Author Unknown, U-Varnish Polyimide Varnish, UBE America Inc., http://www.ube.com/content.php?pageid=83, accessed Sep. 3, 2013, pp. 1-4.

* cited by examiner

*Primary Examiner* — Callie Shosho
*Assistant Examiner* — John Freeman
(74) *Attorney, Agent, or Firm* — MH2 Technology Law Group LLP

(57) ABSTRACT

An endless belt comprising a polyimide-based substrate layer. The polyimide-based substrate layer is made by curing a mixture comprising a polyimide precursor and a polyalkylene glycol silicone phosphate. A method of making the polyimide-based substrate layer and a coating composition for making the endless belt are also disclosed.

20 Claims, 4 Drawing Sheets

COATING COMPOSITION

FIELD OF THE DISCLOSURE

This disclosure is generally directed to an endless belt useful in electrophotographic imaging apparatuses.

BACKGROUND

Centrifugal molding is used to obtain seamless polyimide belts useful as fuser members, transfix members and other endless belt applications. Typically, a thin fluorine or silicone release layer is applied to the inner surface of a rigid cylindrical mandrel. A polyimide coating is applied to the inner surface of the mandrel containing the release layer. The polyimide is cured and then released from the mandrel.

There are drawbacks to this process. For instance, the requirement of a release layer on the inner surface of the mandrel is an additional process step. For fuser belts manufactured in this manner the cost is expensive.

In addition, a polyimide fuser belt can have rigid requirements with respect to such things as modulus of elasticity, durability, onset decomposition temperature and so forth. Finding novel materials that can meet rigid belt specifications while at the same time reducing cost of manufacturing is a desirable objective.

SUMMARY

An embodiment of the present disclosure is directed to an endless belt comprising a polyimide-based substrate layer. The polyimide-based substrate layer is made by curing a mixture comprising a polyimide precursor and a polyalkylene glycol silicone phosphate.

Another embodiment of the present disclosure is directed to a method of forming an endless belt. The method comprises providing a fabrication substrate. Ingredients comprising a polyimide precursor, a polyalkylene glycol silicone phosphate and a solvent are mixed to form a coating composition. The coating composition is coated over the fabrication substrate and cured.

Yet another embodiment of the present disclosure is directed to a coating composition. The coating composition is made by mixing ingredients comprising a polyimide precursor, a polyalkylene glycol silicone phosphate and a solvent.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
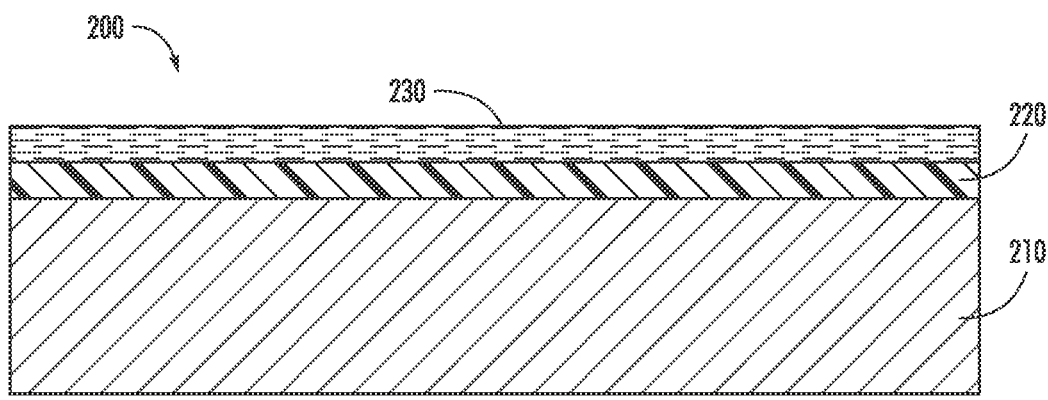
FIG. 1 depicts an exemplary fuser member having an endless belt, accordance to an embodiment of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to an endless belt. The endless belt comprises a polyimide-based substrate layer made by polymerizing a mixture comprising a polyimide precursor and a polyalkylene glycol silicone phosphate.

In various embodiments, the endless belt can include, for example, a substrate, with one or more functional intermediate layers formed thereon. The substrate can be formed using suitable materials that are non-conductive or conductive depending on a specific configuration, for example, as shown in FIG. 1.

FIG. 1 shows an embodiment of a cross-section of an endless belt that can be employed as a fusing member 200. The endless belt can include a belt substrate 210 with one or more functional intermediate layers 220 and an outer surface layer 230 formed thereon. The outer surface layer 230 is also referred to as a release layer. The belt substrate 210 is described in greater detail below.

Functional Intermediate Layer

Examples of materials used for the functional intermediate layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other materials suitable for use as functional intermediate layer 220 also include fluoroelastomers. Example fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a trademark of E.I. DuPont de Nemours, Inc.

The cure site monomer can be 4-bromoperfluorobutene-1; 1,1-dihydro-4-bromoperfluorobutene-1; 3-bromoperfluoropropene-1; 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 is from about 30 microns to about 1,000 microns, or from about 100 microns to about 800 microns, or from about 150 microns to about 500 microns.

Release Layer

An exemplary embodiment of a release layer 230 includes fluoropolymer particles. Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C. These particles are melted to form the release layer.

For the fuser member 200, the thickness of the outer surface layer or release layer 230 can be from about 10 microns to about 100 microns, or from about 20 microns to about 80 microns, or from about 40 microns to about 60 microns.

Adhesive Layer(s)

Optionally, any known and available suitable adhesive layer, also referred to as a primer layer, may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 2A:
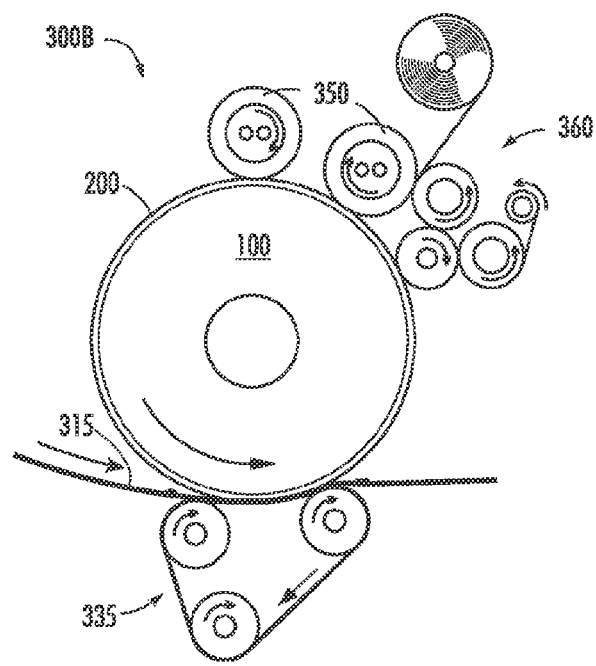
FIGS. 2A-2B depict exemplary fusing configurations using the fuser member shown in FIG. 1 in accordance with the present teachings.
Figure 2B:
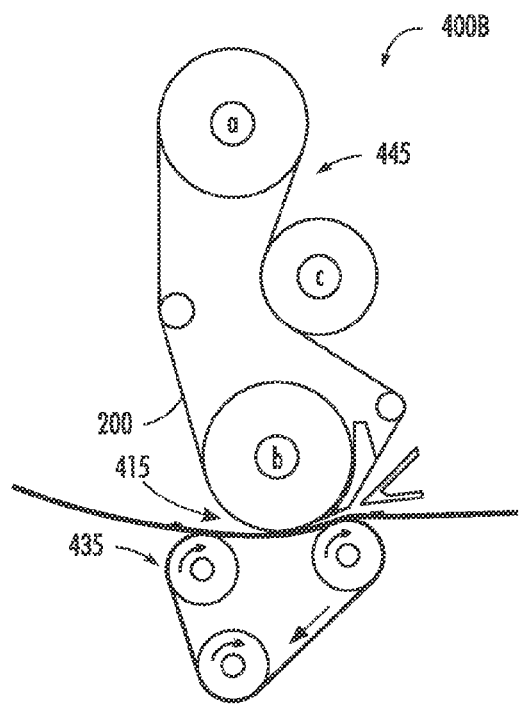

FIGS. 2A and 2B depict an exemplary fusing configuration for the fusing process in accordance with the present teachings. It should be readily apparent to one of ordinary skill in the art that the fusing configurations 300B and 400B depicted in FIGS. 2A-2B, respectively, represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIG. 2A depicts the fusing configuration 300B using a fuser belt 200, as shown in FIG. 1 in accordance with an embodiment of the present teachings. The configuration 300B can include a fuser belt 200 that forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configuration 300B can include one or more external heat rolls 350 along with, e.g., a cleaning web 360, as shown in FIG. 2A.

FIG. 2B depicts the fusing configuration 400B using a fuser belt 200 shown in FIG. 1 in accordance with an embodiment of the present teachings. The configuration 400B can include a fuser belt 200 that forms a fuser nip with a pressure applying mechanism 435, such as a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configuration 400B can include a mechanical system 445 to move the fuser belt 200 and thus fusing the toner particles and forming images on the media substrate 415. The mechanical system 445 can include one or more rolls 445a-c, which can also be used as heat rolls when needed.

Figure 3:
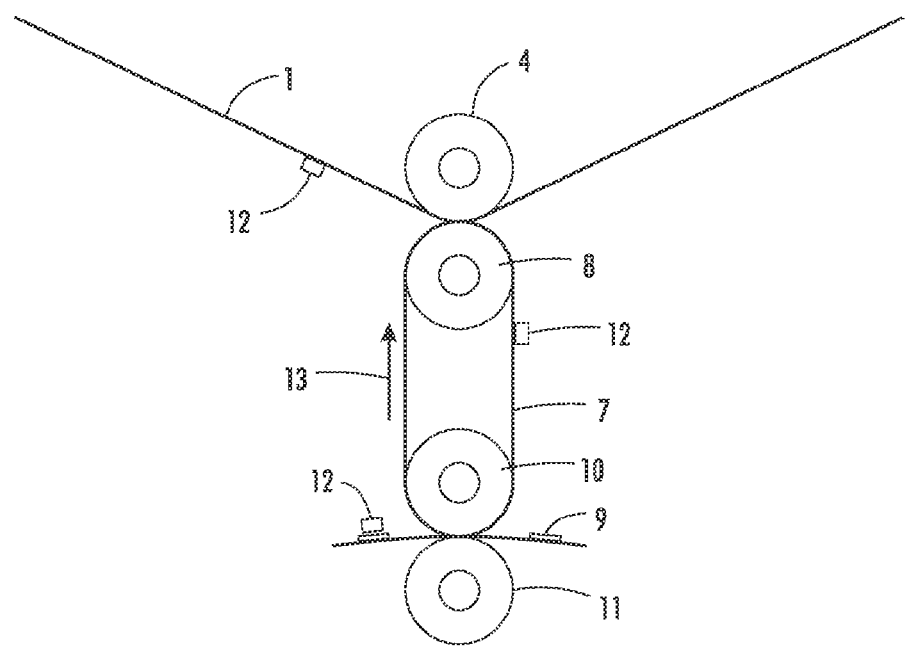
FIG. 3 depicts a fuser configuration using a transfix apparatus.

FIG. 3 demonstrates a view of an embodiment of a transfix member 7, which may be in the form of a belt, sheet, film, or like form. The transfix member 7 is constructed similarly to the fuser belt 200 described above. The developed image 12 positioned on intermediate transfer member 1, is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Substrate Layer

Described herein is a polyimide composition suitable for use as a substrate layer 210 of FIG. 1. The polyimide composition includes a polyalkylene glycol silicone phosphate. One or more benefits of the polyalkylene glycol silicone phosphate may be realized, such as self-release of the polyimide substrate, reduced fabrication time by avoiding the need for applying a separate release layer; the ability to form a self-release polyimide substrate without the use of a fluorine containing additive; realization of reduced contaminants on the polyimide belt surface; increased mechanical strength of the polyimide substrate and/or improved compatibility of the polyimide substrate with a subsequently applied silicone elastomer.

In an embodiment, the polyalkylene glycol silicone phosphate can allow the polyimide substrate to self-release from a fabrication substrate, such as a stainless steel or other metal substrate, during the manufacturing process of the fuser belt 200. The term self-release, as used herein, means that the substrate layer 210 can automatically release from the fabrication substrate without the use of a separate release layer formed between the substrate layer 210 and the fabrication substrate. The phrase automatically release means that the substrate layer 210 will automatically separate from the fabrication substrate upon cooling down to room temperature with no or substantially no additional physical force needed to provide the separation, so that the substrate layer 210 can easily be slid off the fabrication substrate. Most references report applying an external release layer on the fabrication substrate before coating the polyimide layer, and then releasing it. The disclosed composition is cost effective since only one coating layer is needed.

In an embodiment, the disclosed polyimide composition of the fuser belt 200 is made using a polyimide precursor, such as a biphenyl tetracarboxylic dianhydride/phenylenediamine. Such polyimide precursors are generally well known in the art.

The polyalkylene glycol silicone phosphate is mixed with the polyimide precursor. In an embodiment, a sufficient amount is employed so that the polyalkylene glycol silicone phosphate can function as a release agent that can facilitate release of the polyimide from the fabrication substrate during manufacture of the belt. While it may be possible that the polyalkylene glycol silicone phosphate may chemically interact with the polyamic acid, which is the polyimide precursor, it is unclear to precisely what extent the polyalkylene glycol silicone phosphate bonds to the polyimide network, or whether mere physical blending of the polyalkylene glycol silicone phosphate occurs.

Any suitable polyalkylene glycol silicone phosphate that will provide the desired properties can be employed. In an embodiment, the polyalkylene glycol silicone phosphate is selected from the group consisting of polyethylene glycol silicone phosphate and polyethylene glycol-co-propylene glycol silicone phosphate. For example, the polyethylene glycol silicone phosphate of formula 1 or the polyethylene glycol-co-propylene glycol silicone phosphate compound of formula 2 can be employed:

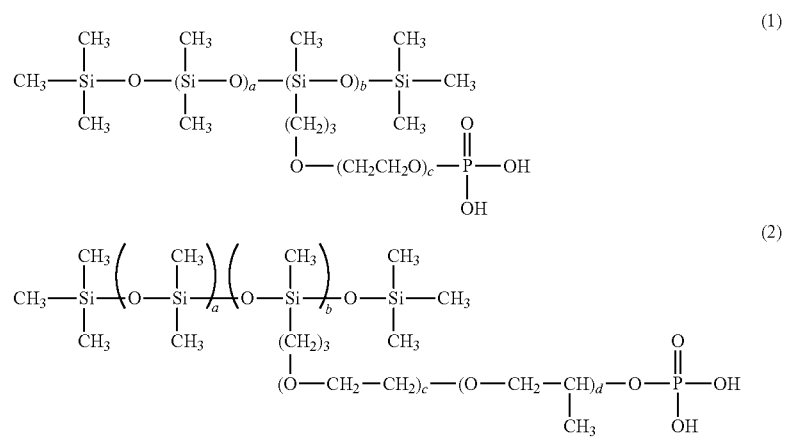

Where a, b, c and d are the number of the corresponding repeating units. In an embodiment, a ranges from about 4 to about 200, or from about 6 to about 100; b ranges from about 1 to about 30, or from about 2 to about 10; c ranges from about 1 to about 40, or from about 2 to about 20; and d ranges from about 1 to about 40, or from about 2 to about 20.

In an example, the disclosed PEG silicone phosphate is prepared by the reaction of polyethylene glycol (PEG) dimethicone copolyol with polyphosphoric acid. A commercial example of the PEG silicone phosphate is SILSENSE® PE-100 silicone from Lubrizol. In an example, the disclosed PEG-co-PPG silicone phosphate is prepared by the reaction of polyethylene glycol-co-propylene glycol (PEG-co-PPG) dimethicone copolyol with polyphosphoric acid. Commercial examples of the PEG-co-PPG silicone phosphate include SILPHOS® A-100 and A-150 from Siltech Corp. The acid value of the silicone phosphate is from about 10 mg KOH/g to about 100 mg KOH/g, or from about 20 mg KOH/g to about 80 mg KOH/g. These silicone phosphate exist in acid form, and their corresponding salt form can also be used. Commercial examples of the PEG-co-PPG silicone phosphate in sodium salt form include SILPHOS® J208 and D1008 from Siltech Corp.

Any suitable amount of the polyalkylene glycol silicone phosphate can be employed. For example, from about 0.01 weight percent to about 5 weight percent of the polyimide substrate, such as from about 0.1 to about 5 weight percent of the substrate, or from about 0.2 to about 4 weight percent, or from about 0.5 to about 3 weight percent of the substrate.

The disclosed polyimide of the substrate layer 200 can be formed by employing a polyamic acid approach that involves mixing at least one dianhydride and at least one diamine, as is well known in the art. The dianhydride and diamine can react in a suitable solvent to yield a corresponding polyamic acid. The polyamic acid can be cyclized to form the polyimide.

Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl) hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxyl)phenyl)ether dianhydride, di-(4-(3,4-dicarboxyphenoxyl)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl) ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxyl)phenyl]sulfone, bis[4-(3-aminophenoxyl) phenyl]ketone, 4,4'-bis(3-aminophenoxy)biphenyl, 2,2-bis [4-(3-aminophenoxyl)phenyl]-propane, 2,2-bis[4-(3-aminophenoxyl)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl) propane, and 2,2-di(p-aminophenyl)-1,1,1,3,3,3-hexafluoropropane, and the like and mixtures thereof.

The dianhydrides and diamines are, for example, selected in a weight ratio of from about 20:80 to about 80:20, and more specifically, in an about 50:50 weight ratio. The above aromatic dianhydride like aromatic tetracarboxylic acid dianhydrides and diamines like aromatic diamines are used singly or as a mixture, respectively.

Examples of well known polyimide precursor dianhydride/diamine mixtures include pyromellitic dianhydride/4,4'-oxydianiline, pyromellitic dianhydride/phenylenediamine, biphenyl tetracarboxylic dianhydride/4,4'-oxydianiline, biphenyl tetracarboxylic dianhydride/phenylenediamine, benzophenone tetracarboxylic dianhydride/4,4'-oxydianiline, benzophenone tetracarboxylic dianhydride/4,4'-oxydianiline/phenylenediamine, and the like and mixtures thereof.

Commercial examples of polyimide precursors of pyromellitic dianhydride/4,4-oxydianiline include PYRE-ML RC5019 (about 15-16 weight percent in N-methyl-2-pyrrolidone, NMP), RC5057 (about 14.5-15.5 weight percent in NMP/aromatic hydrocarbon=80/20), and RC5083 (about 18-19 weight percent in NMP/DMAc=15/85), all from Industrial Summit technology Corp., Parlin, N.J.; DURIMIDE® 100, commercially available from FUJIFILM Electronic Materials U.S.A., Inc.

Commercial examples of polyimide precursors of biphenyl tetracarboxylic dianhydride/4,4'-oxydianiline include U-VARNISH A, and S (about 20 weight in NMP), both from UBE America Inc., New York, N.Y.

Commercial examples of polyimide precursors of biphenyl tetracarboxylic dianhydride/phenylenediamine include PI-2610 (about 10.5 weight in NMP), and PI-2611 (about 13.5 weight in NMP), both from HD MicroSystems, Parlin, N.J.; and BPDA resin (about 16.5 weight in NMP) from Kaneka Corp.

Commercial examples of polyimide precursors of benzophenone tetracarboxylic dianhydride/4,4'-oxydianiline include RP46, and RP50 (about 18 weight percent in NMP), both from Unitech Corp., Hampton, Va.

Commercial examples of polyimide precursors of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all from HD MicroSystems, Parlin, N.J.

Various amounts of polyimide precursors can be selected for the substrate, such as for example, from about 95 to about 99.9 weight percent, from about 96 to about 99.8 weight percent, or from about 97 to about 99.5 weight percent, based on the total weight of the substrate.

The polymers employed in the polyimide-based substrate can comprise any suitable polyimide repeating units. Examples of suitable polyimide repeating units are represented by the structures in the parenthesis below:

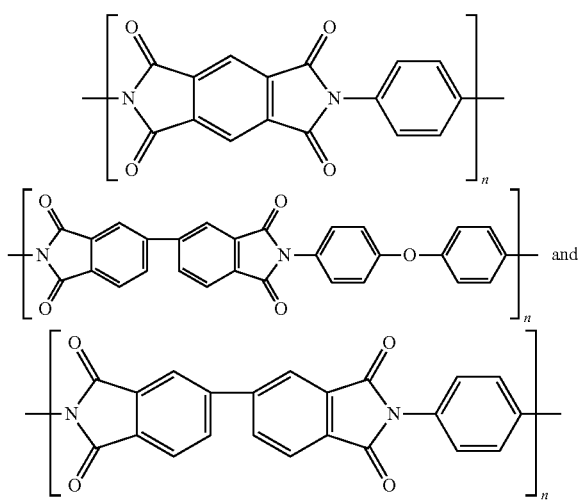

wherein n represents that a variable number of the repeating groups can be employed. In an embodiment, n can be greater than 50 or 100, such as greater than 500, 1000 or greater than 10,000 units, depending on the degree of polymerization. One of ordinary skill in the art would readily be able to determine a desired degree of polymerization for the polyimide material in the substrate.

The polyimide substrate composition can optionally contain a polysiloxane copolymer to enhance or smooth the coating. The concentration of the polysiloxane copolymer is less than about 1 weight percent or less than about 0.2 weight percent, based on the total weight of the substrate. The optional polysiloxane copolymer includes a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether). Example weight ratios of the polyimide, the polyalkylene glycol silicone phosphate and the polysiloxane polymer of the polyimide-based substrate can range from about 99.9/0.09/0.01 to about 95/4/1.

In an embodiment, the disclosed polyimide substrate layer 210 possesses a Young's modulus of from about 4,000 MPa to about 10,000 MPa, or from about 5,000 MPa to about 10,000 MPA, or from about 6,000 MPA to about 10,000 MPa; and an onset decomposition temperature of from about 400° C. to about 600° C., or from about 425° C. to about 575° C., or from about 450° C. to about 550° C.

Coating Composition

Also described herein is a composition used to preparing a seamless fuser belt substrate via flow coating. In a typical centrifugal molding process, a thin fluorine or silicone release layer is applied on the inside of a rigid cylindrical mandrel, and then the polyimide layer is applied and subsequently cured and released from the mandrel. Using a flow coating process and the disclosed composition, the release layer can be eliminated, thus reducing manufacturing cost.

The coating composition is made by mixing ingredients comprising a polyimide precursor, a polyalkylene glycol silicone phosphate; and a solvent. Any of the polyimide precursors discussed herein can be employed. In an embodiment, the polyimide precursor comprises at least one dianhydride and at least one diamine, as discussed herein above.

The release agent can be any suitable polyalkylene glycol silicone phosphate. Examples include polyethylene glycol silicone phosphate and polyethylene glycol-co-propylene glycol silicone phosphate. The amount of polyalkylene glycol silicone phosphate present in the coating composition can range from about 0.01 to about 1 weight percent, based on the weight of the solids in the coating composition, such as about 0.05 weight percent to about 0.5 weight percent, or from about 0.1 weight percent to about 0.4 weight percent, or from about 0.15 weight percent to about 0.3 weight percent, based on the weight of solids in the coating composition.

The coating composition includes a solvent. Examples of the solvent include toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride and mixtures thereof. Any suitable amount of solvent can be employed. Example solvent concentrations range from about 70 weight percent to about 95 weight percent, or from about 80 weight percent to about 90 weight percent, based on the total weight of the coating composition.

Additives and additional conductive or non-conductive fillers may be present in the above-described composition. In various embodiments, other filler materials or additives including, for example, inorganic particles, can be used for the coating composition and the subsequently formed surface layer. Fillers used herein include carbon blacks, aluminum nitride, boron nitride, aluminum oxide, graphite, graphene, copper flakes, nano diamond, carbon nanotubes, metal oxides, doped metal oxides, metal flakes, and mixtures thereof. In various embodiments, other additives known to one of ordinary skill in the art can also be included to form the disclosed composite materials.

Polyimide-Based Substrate Manufacturing Process

Figure 5:
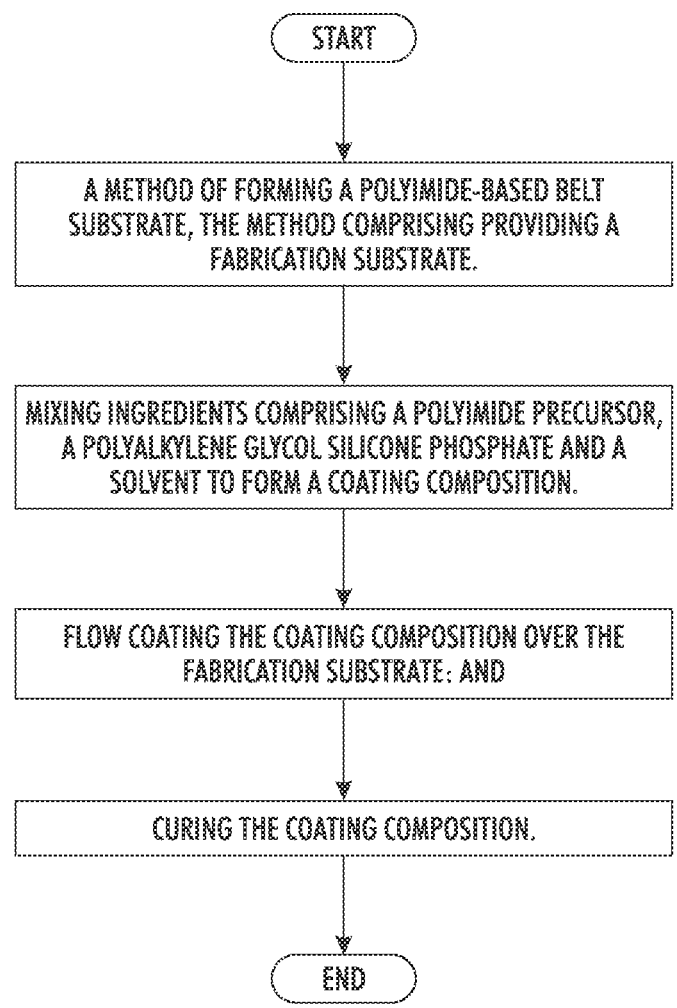
FIG. 5 is a flowchart of a process for making an endless belt, according to an embodiment of the present disclosure.

FIG. 5 illustrates a process for manufacturing the polyimide-based substrates, according to an embodiment of the present disclosure. As shown in FIG. 5, a fabrication substrate is provided. The fabrication substrate acts as a mold for forming the polyimide based substrates of the present disclosure. Any suitable fabrication substrate can be employed. Examples include welded stainless steel belt substrates or electroformed seamless nickel belt substrates, seamless stainless steel, aluminum or glass drums, which are well known in the art. Any other suitable substrate configurations and/or materials can also be used.

The seam thickness and profile of the seamed stainless steel belt can be minimized, and the surface finish and roughness of the substrate belt can be specified. For example, a rough lathed or honed belt is better for the polyimide layer release. Such a configuration easily allows the production of belts of various lengths and widths. Using a rotating mandrel limits the width and length of the belts able to be produced as each belt requires a separate mandrel.

In one embodiment, the coating substrate is a rough lathed substrate with a Ra (average roughness) of from about 0.01 micron to about 0.5 micron, or from about 0.05 micron to about 0.3 micron, or from about 0.1 micron to about 0.2 micron; and a Rmax or from about 0.05 micron to about 2 micron, or from about 0.1 micron to about 1 micron, or from about 0.2 micron to about 0.7 micron. The back of the polyimide fuser substrate flow coated from this substrate is similarly rough lathed.

In another embodiment, the coating substrate is a honed substrate with a Ra of from about 0.15 micron to about 1 micron, or from about 0.2 micron to about 0.8 micron, or from about 0.3 micron to about 0.7 micron; and a Rmax of from about 0.5 micron to about 10 microns, or from about 1 micron to about 7 microns, or from about 2 microns to about 4 microns. The back of the polyimide fuser substrate flow coated from this substrate is similarly honed.

Referring again to FIG. 5, the composition is coated on the fabrication substrate in any suitable known manner. Typical techniques for coating the compositions of the present disclosure on the fabrication substrate include flow coating, liquid spray coating, dip coating, wire wound rod coating, fluidized bed coating, powder coating, electrostatic spraying, sonic spraying, blade coating, molding, laminating, and the like. The coating composition can be flow coated on the fabrication substrate at the desired product circumference.

The coated composition is cured. Any suitable method for curing can be employed. In an embodiment, the coated composition is partially cured, or pre-cured, at from about 150° C. to about 250° C., or from about 180° C. to about 220° C. for a time of from about 30 minutes to about 90 minutes, or from about 45 minutes to about 75 minutes, and self releases from the fabrication substrate.

Figure 4:
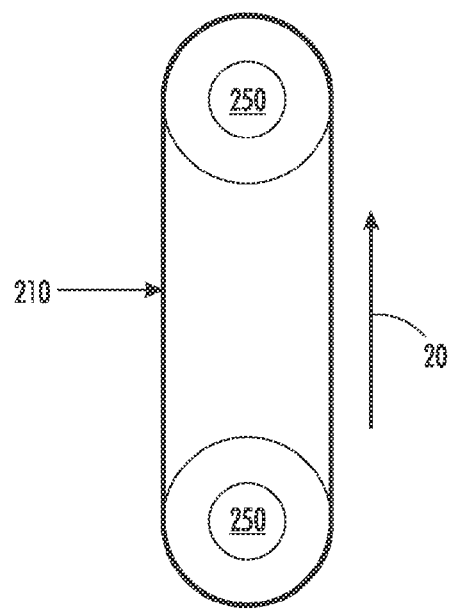
FIG. 4 depicts a tensioning of a fusing member for final curing.

Following release of the polyimide further curing can be performed. For example, the released belt can be completely cured at from about 250° C. to about 370° C., or from about 300° C. to about 340° C., for a time of from about 30 minutes to about 150 minutes, or from about 60 minutes to about 120 minutes under tension in the configuration shown in FIG. 4. This final curing is at a desired tension, such as, for example, from about 1 kilogram to about 10 kilograms. As shown in FIG. 4, the pre-cured belt 210 can be tensioned between two rollers 250 while rotating the direction of arrow 20. The final curing produces a belt that exhibits a modulus suitable for use as a fuser member.

In an embodiment, the substrate can be rotated at a desired speed during the coating and/or curing process. For example, the substrate can be rotated at from about 20 rpm to about 100 rpm, or from about 40 rpm to about 60 rpm during the thermal curing of the coating.

A desired polyimide substrate layer thickness can be achieved by single pass or multi pass coating. The curing processes may be different for single or multi-pass methods. For example, a single pass technique can include pre-curing at a temperature between about 125° C. and about 250° C. for a time of about 30 minutes to about 90 minutes, and then fully cured at a temperature between about 250° C. and about 370° C. for a time of about 30 minutes to about 90 minutes. In an example of multi-pass, such as dual pass, a bottom polyimide layer is coated on a substrate and pre-cured between about 125° C. and about 190° C. for a time of about 30 minutes to about 90 minutes, and a top polyimide layer is subsequently coated on the pre-cured bottom polyimide layer and pre-cured between about 125° C. and about 190° C. for a time of about 30 minutes to about 90 minutes, and then the dual layer polyimide layer is fully cured at a temperature between about 190° C. and about 370° C. for a time of about 30 minutes to about 90 minutes.

Specific examples will now be described in detail. These examples are intended to be illustrative, and not limited to the materials, conditions, or process parameters set forth in these embodiments. All parts are percentages by solid weight unless otherwise indicated.

EXAMPLES

Example 1

A composition comprising polyamic acid of biphenyl tetracarboxylic dianhydride/p-diaminobenzene/PEG-co-PPG silicone phosphate=99/1 was prepared in NMP, about 16.5 wt % solid, where the polyamic acid is from Kaneka Corp.; and the PEG-co-PPG silicone phosphate (Silphos® A-100) is from Siltech Corp. The composition liquid was coated on a stainless steel substrate, and subsequently cured at 135° C. for 30 minutes, 190° C. for 30 minutes and 320° C. for 60 minutes.

The resulting polyimide self-released from the stainless steel substrate, and a 60 μm very smooth polyimide substrate was obtained noting that the PEG-co-PPG silicone phosphate can serve as the leveling agent. The adhesion of the resulting polyimide substrate and the top silicone layer is not expected to be an issue due to the silicone part of the release agent.

Example 2

A composition comprising polyamic acid of biphenyl tetracarboxylic dianhydride/p-diaminobenzene/PEG silicone phosphate=99/1 was prepared in NMP, about 16.5 wt % solid, where the polyamic acid is from Kaneka Corp.; and the PEG silicone phosphate (SILSENSE® PE-100 silicone) is from Lubrizol. The composition liquid was coated on a stainless steel substrate, and subsequently cured at 135° C. for 30 minutes, 190° C. for 30 minutes and 320° C. for 60 minutes.

The resulting polyimide self-releases from the stainless steel substrate. The adhesion of the resulting polyimide substrate and the top silicone layer is not expected to be an issue due to the silicone part of the release agent.

The Young's Modulus was measured by following the known ASTM D882-97 process. A sample (0.5 inch×12 inch) of the fuser members or belts prepared above were placed in an Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross-sectional area of each of the tests.

The Young's modulus of Example 1 was about 8,200 MPa, and that of Example 2 was about 8,400 MPa, higher than a polyimide sample with no silicone phosphate incorporated. Thus, incorporation of the silicone phosphate into the polyimide fuser substrate not only made the substrate self-releasing from the metal fabrication substrate, but also made the substrate mechanically stronger.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An endless belt comprising:
   a polyimide-based substrate layer made by curing a mixture comprising a polyimide precursor and a polyalkylene glycol silicone phosphate.

2. The endless belt of claim 1, wherein a concentration of the polyalkylene glycol silicone phosphate in the mixture is in an amount sufficient to allow the polyimide-based substrate layer to self-release from a stainless steel fabrication substrate during manufacture of the polyimide-based substrate layer.

3. The endless belt of claim 1, wherein the polyalkylene glycol silicone phosphate is selected from the group consisting of polyethylene glycol silicone phosphate and polyethylene glycol-co-propylene glycol silicone phosphate.

4. The endless belt of claim 1, wherein the polyimide precursor comprises at least one dianhydride and at least one diamine.

5. The endless belt of claim 4, wherein the at least one dianhydride is selected from the group consisting of pyromellitic dianhydride and biphenyl tetracarboxylic dianhydride; and the at least one diamine is selected from the group consisting of 4,4-oxydianiline and p-diaminobenzene.

6. The endless belt of claim 1, wherein the polyimide-based substrate layer comprises a polyimide repeating unit represented by at least one of the structures in the parenthesis below:

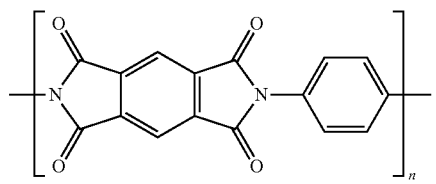

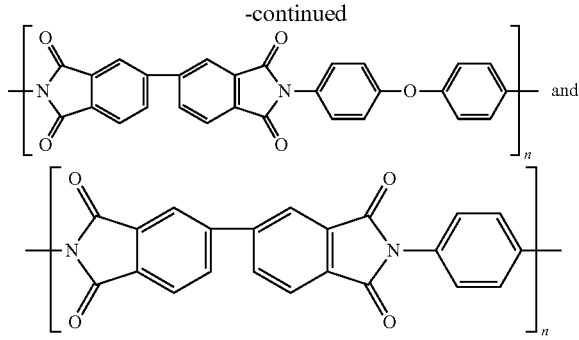

wherein n represents that a variable number of the repeating units can be employed.

7. The endless belt of claim 1, wherein the polyimide-based substrate layer further comprises at least one filler selected from the group consisting of aluminum nitride, boron nitride, aluminum oxide, graphite, graphene, copper flakes, nano diamond, carbon blacks, carbon nanotubes, metal oxides, doped metal oxide and metal flakes.

8. The endless belt of claim 1, further comprising an intermediate layer disposed on the polyimide-based substrate layer, and a release layer disposed on the intermediate layer.

9. A method of forming an endless belt, the method comprising:
   providing a fabrication substrate;
   mixing ingredients comprising a polyimide precursor, a polyalkylene glycol silicone phosphate and a solvent to form a coating composition;
   flow coating the coating composition over the fabrication substrate; and
   curing the coating composition to form a polyimide composition.

10. The method of claim 9, wherein the solvent is selected from the group consisting of tetrahydrofuran, methyl ethyl ketone, methyl isobutyl ketone, N,N'-dimethylformamide, N,N'-dimethylacetamide, N-methylpyrrolidone, and methylene chloride.

11. The method of claim 9, wherein the curing comprises pre-curing the coating composition at a temperature of from about 125° C. to about 250° C., followed by a final curing at a temperature of from about 250° C. to about 370° C.

12. The method of claim 9, wherein the polyalkylene glycol silicone phosphate is selected from the group consisting of polyethylene glycol silicone phosphate and polyethylene glycol-co-propylene glycol silicone phosphate.

13. The method of claim 9, wherein the polyimide precursor comprises at least one dianhydride and at least one diamine.

14. The method of claim 13, wherein the at least one dianhydride is selected from the group consisting of pyromellitic dianhydride and biphenyl tetracarboxylic dianhydride; and the at least one diamine is selected from the group consisting of 4,4-oxydianiline and p-diaminobenzene.

15. The method of claim 9, further wherein the cured composition self-releases from the fabrication substrate.

16. A coating composition for forming a polyimide composition made by mixing ingredients comprising:
   a polyimide precursor;
   a polyalkylene glycol silicone phosphate; and
   a solvent.

17. The coating composition of claim 16, wherein the polyimide precursor comprises at least one dianhydride and at least one diamine.

18. The coating composition of claim 17, wherein the at least one dianhydride is selected from the group consisting of pyromellitic dianhydride and biphenyl tetracarboxylic dianhydride; and the at least one diamine is selected from the group consisting of 4,4-oxydianiline and p-diaminobenzene.

19. The coating composition of claim 16, wherein the polyalkylene glycol silicone phosphate is present in the mixture in an amount of from about 0.01 to about 1 weight percent of solids.

20. The coating composition of claim 16, wherein the polyalkylene glycol silicone phosphate is selected from the group consisting of polyethylene glycol silicone phosphate and polyethylene glycol-co-propylene glycol silicone phosphate.

* * * * *